United States Patent
Tyni et al.

(10) Patent No.: US 7,275,623 B2
(45) Date of Patent: Oct. 2, 2007

(54) ALLOCATING LANDING CALLS IN AN ELEVATOR GROUP USING A COST FUNCTION

(75) Inventors: Tapio Tyni, Hyvinkää (FI); Jari Ylinen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 11/406,234

(22) Filed: Apr. 19, 2006

(65) Prior Publication Data

US 2006/0243536 A1  Nov. 2, 2006

Related U.S. Application Data

(63) Continuation of application No. PCT/FI2004/000632, filed on Oct. 27, 2004.

(30) Foreign Application Priority Data

Nov. 3, 2003  (FI)  .................. 20031589

(51) Int. Cl.
*B66B 1/18*  (2006.01)
(52) U.S. Cl. ..................... 187/382; 187/387
(58) Field of Classification Search .............. 187/247, 187/248, 280–287
See application file for complete search history.

(56) References Cited

U.S. PATENT DOCUMENTS

| 5,612,519 A | 3/1997 | Chenais |
| 5,767,461 A * | 6/1998 | Nakagawa et al. ......... 187/382 |
| 5,907,137 A * | 5/1999 | Tyni et al. .................. 187/382 |
| 5,932,852 A | 8/1999 | Tyni et al. |
| 6,293,368 B1 | 9/2001 | Ylinen et al. |
| 6,439,349 B1 * | 8/2002 | Smith ......................... 187/382 |
| 7,032,715 B2 * | 4/2006 | Smith et al. ................ 187/380 |
| 2004/0060776 A1* | 4/2004 | Tyni et al. .................. 187/380 |

FOREIGN PATENT DOCUMENTS

WO    WO 02/066356 A1    8/2002

* cited by examiner

*Primary Examiner*—Jonathan Salata
(74) *Attorney, Agent, or Firm*—Birch, Stewart, Kolasch & Birch, LLP

(57) ABSTRACT

An elevator group control method for the allocation of calls, in which method a given service time of the elevator group is assigned a target value. The service time may be passenger waiting time, call time, traveling time, riding time or an average value of one of these quantities. The method aims at fulfilling the assigned target value in such a way that the energy consumption of the elevator system is minimized. Optimization is implemented using a model of the elevator system, by means of which the desired service time can be predicted. This prediction is utilized in a controller controlling the optimizer. This makes it possible to improve the construction and operation of the controller and optimizer so that the energy consumption of the elevator system can be reduced while the condition regarding the target service time is fulfilled at the same time.

14 Claims, 3 Drawing Sheets

ALLOCATING LANDING CALLS IN AN ELEVATOR GROUP USING A COST FUNCTION

Figure 1:
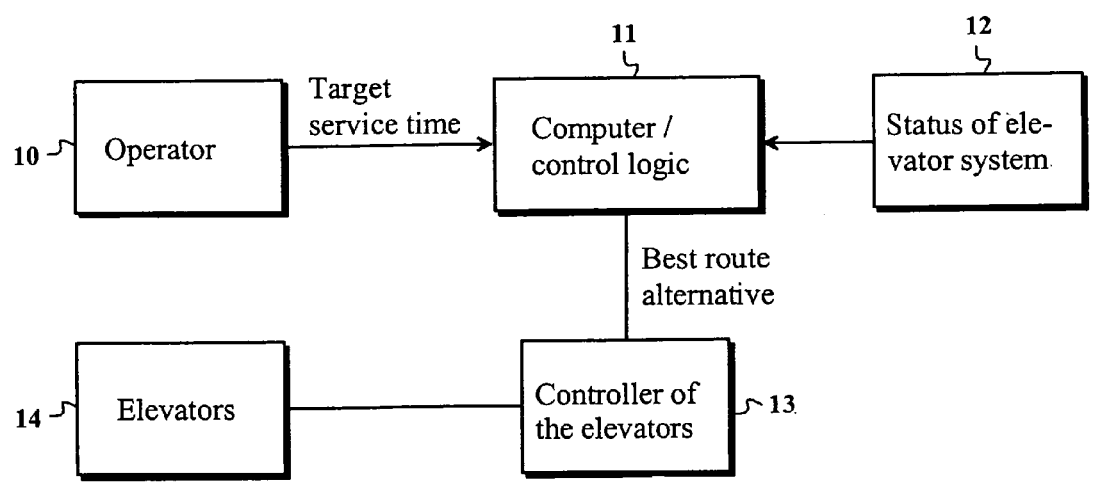

This application is a Continuation of co-pending PCT International Application No. PCT/FI2004/000632 filed on Oct. 27, 2004, which designated the United States, and on which priority is claimed under 35 U.S.C. § 120. This application also claims priority under 35 U.S.C. § 119(a) on Patent Application No(s). 20031589 filed in Finland on Nov. 3, 2003. The entire contents of each of the above documents is hereby incorporated by reference.

FIELD OF THE INVENTION

The present invention relates to the control of an elevator. In particular, the invention concerns a method and an apparatus for controlling an elevator group by allocating calls by considering a target value of service time and minimizing energy consumption.

BACKGROUND OF THE INVENTION

Among many different functions, the basic function of elevator group control is call allocation. The aim of allocation is to distribute the calls to be served by the elevator cars in such a way that one of the indicators describing the elevator system is optimized. Traditionally, the most commonly used indicators relate to call times and passenger waiting times. Typically, the average values of these are calculated and their distributions are determined. 'Calls' refers generally to all calls issued, i.e. both calls given by pressing up/down buttons at landings and destination floor calls given from an elevator car. The former are landing calls and the latter car calls. In addition, the calls include the calls needed in the so-called destination control method, which are issued via call input devices. In the destination control method, the elevator customer indicates his/her destination floor to the system already in the elevator lobby via a call input device, and in this case no separate call needs to be given in the elevator car.

There are various call allocation methods, and each elevator manufacturer have their own methods for implementing this function. However, a feature common to these different methods is that they employ a number of parameters characteristic to each method, by means of which the operation of the method is controlled. The control can be so implemented that in different traffic situations a set of parameters suited for the particular situation is applied. This is designed to give the system a possibility to adapt to the prevailing traffic situation, e.g. a peak traffic situation in the building.

In a prior-art control method, a traffic detector monitors the operation and state of the elevator system and determines the prevailing traffic type. The things to be monitored typically include the calls, the loads of the elevators and the motional states of the elevators. Depending on the traffic type detected, a parameter set tailored for this traffic type is introduced. For example, a set of parameters for outgoing peak traffic may give a greater weight to calls with a lobby floor as a destination than to calls issued from lobby floors. During a peak traffic condition, the objective may be to give a greater weight to minimizing the traveling time of the passengers in the car. When the aim is to minimize two or more aspects at the same time, this is a case of multi-objective optimization.

A difficulty in the above-described prior-art method is how to define the practical values of each parameter set in the parameter bank corresponding to different traffic situations. These parameters are sensitive to things like building type, number of floors, distribution of passengers between different floors of the building, number of elevators in the group, and properties of the elevators. In addition, actual traffic in the building varies, the number of elevator users at different floors in the building does not remain constant in the long run, and inaccuracies, detection errors and detection delays may easily occur in the operation of the traffic detector.

In practice, the parameter sets stored in the parameter bank have to be assigned compromise values such that will work reasonably well in a majority of deliveries without a need to change the parameters later on site. These parameter values may have been set e.g. on the basis of simulation operation or expert experience. It is obvious that this kind of average parameter values do not lead to the best possible operation the building, elevator group and traffic situation concerned in each case.

Another problem in selecting the parameter set on the basis of traffic type is how to choose the aspects to be weighted and how to determine the weighting values. It is possible to find numerous aspects to be optimized, such as call time, estimated passenger waiting time, riding time and traveling time, number of stops, car load, number of simultaneous car an landing calls, etc. The problem to be solved is which one of these aspects should be weighted and to what degree in each traffic situation. If the aspects are selected and the weighting values are fixed beforehand, then this is a choice made in advance by the designer, which does not necessarily correspond to the needs of the owner of the building. On the other hand, if the aspects to be optimized are not fixed beforehand, the operating personnel of the building can be considered as being allowed a freedom to decide for themselves about the weighting in different traffic situations. However, due to the complex nature of the adjustments and the matter as a whole, this is not a reasonable alternative.

Specification WO 02/066356 discloses a method for controlling an elevator group wherein the energy consumed by the elevator system is minimized so that a desired service time of elevator passengers if fulfilled on an average. In this method, a given service time of the elevator group is assigned a target value for call allocation. The service time used may be e.g. call time, passenger waiting time, traveling time or riding time.

In other words, the control method optimizes two incommensurable quantities of different types, i.e. waiting time and energy consumption. In the method according to specification WO 02/066356, to render these quantities commensurable and mutually comparable, the routes R of the elevators are selected in such a way that the cost term $$C = W_T T_N(R) + W_E E_N(R) \qquad (1)$$

is minimized. $T_N(R)$ is a normalized sum of call times for route alternative R and correspondingly $E_N(R)$ is normalized energy consumption for route alternative R. $W_T$ and $W_E$ are the weighting coefficients of the above-mentioned cost terms, such that $$0 \leq W_T \leq 1 \text{ and } W_E = 1 - W_T. \qquad (2)$$

Individual waiting times are exponentially distributed, but their sum T(R) roughly follows a normal distribution, so they allow the application of normalization $T_N(R) = (T(R) - \mu_T)/\sigma_T$. Similarly for the energy term $E_N(R) = (E(R) - \mu_E)/\sigma_E$. The expected values $\mu$ and mean distributions $\sigma$ are the indicators for the whole set of aspects, i.e. for the route alternatives for the elevators suited to the current situation. In practice, since the number of route alternatives increases exponentially with the number of calls, sample quantities are resorted to: instead of the expected value, sample mean values $\overline{T}$ and $\overline{E}$ are used, and instead of the mean distribution, sample mean distributions $S_T$ and $S_E$ are used. As a result, $$T_N(R) \approx (T(R) - \overline{T}(R'))/S_T(R') \text{ and}$$

$$E_N(R) \approx (E(R) - \overline{E}(R'))/S_E(R'), \quad (3)$$

where R' is a number of randomly generated route alternatives sufficient to produce reliable estimates for μ and σ. After the normalization, both optimization targets approximately follow the distribution N(0,1) and can thus be summed without problems.

When calls are allocated in this manner, we can distinguish in the operation of the system two different extreme situations, i.e. $W_T=1$ and $W_E=0$, and on the other hand $W_T=0$ and $W_E=1$. In the first situation, the optimization system finds such routes for the elevators that the total waiting time for the calls is as short as possible regardless of energy consumption. In the second situation, the optimization system arranges the routes in such a way that the elevators will consume as little energy as possible but the total waiting time is neglected. It can be considered that optimization of waiting times and optimization of energy consumption are contrary objectives, because when only one of the objectives is optimized, the other objective suffers. Between the aforesaid extreme situations, the operating point can be moved in a sliding manner by selecting the weighting coefficients $W_T$ and $W_E$ in accordance with equation (2).

Although there are now only two aspects to be optimized and by changing the weightings of these it is possible to move steplessly from pure waiting time optimization to pure energy consumption optimization, there remains the difficult question of how to define the weighting coefficients $W_T$ and $W_E$. The weighting coefficients should be set on a suitable basis so that they are applicable to different identified traffic types and intensities in the location of the elevator system concerned. In the prior-art method, the basic aim was to allocate the calls in such a way that a given passenger service time, such as e.g. waiting time, remains at a certain average level regardless of the traffic situation and intensity. By selecting suitable parameters $W_T$ and $W_E$ for each traffic situation, the set objective regarding waiting time is attained. At the same time, the amount of energy needed for transporting the passengers can be reduced because no unnecessary effort is made to provide faster service to customers than required by the set waiting time objective.

In the prior-art method, traffic identification and parameter sets bound with it are effectively eliminated by methods known from control system engineering. In control system engineering, it is an objective to control a process in such a way that that the quantity to be controlled remains at its target value as well as possible. The idea is to compare the controlled quantity to a set value and to generate from the error between these a control quantity that can be used to direct the operation of the system in the correct direction so that the error between the set value and the controlled quantity disappears.

It is desirable that the average waiting time of passengers traveling in the elevator system can be controlled. In prior art, real-time measurements of this quantity are obtained via landing call buttons. A call is activated when a passenger entering the system issues the call, and it is removed when the elevator to which it was allocated starts decelerating to the floor and simultaneously resets the call. Individual call times thus realized are compared to a set target time.

As the results of these individual call time measurements vary over a wide time range from zero to values as high as over 90 seconds, the prior-art method uses only the integrating block of the three possible blocks of a PID controller. The integrating block drives the mean error to zero. In the control method, a sufficiently long integrating time constant has to be selected to ensure that an individual measurement significantly differing from the mean value will not have an excessive effect on the control, but the time constant has to be short enough to allow the system to react to changes occurring in the traffic type and intensity.

From the output of the integrating controller, the weighting coefficient $W_E$ for the optimization of energy consumption is obtained directly. From this is further obtained the weighting coefficient $W_T$ for the optimization of waiting time according to equation (2). It is thinkable that, in a situation where the actual measured call time is the same as the target value of call time, call times have been perfectly optimized without regard to energy consumption. In this case, the zero value at the controller output is also the weighting coefficient used for energy consumption. If, for example, the average of actual call times shifts to a level lower than the target, in other words, if the system is serving too well as compared to the target set in optimization e.g. due to a quieter traffic situation, then the error will become greater. As a consequence, weighting coefficient $W_E$ increases and $W_T$ decreases, so the waiting times indicated by the waiting time characteristic become longer; in other words, the significance of energy consumption in the selection of route alternatives increases and the significance of call times decreases.

The actual allocation of elevators to the calls issued, i.e. the calculations for finding the most optimal route alternative for the elevators of the elevator system are performed by an optimizer. The optimizer receives as input data the weighting coefficients calculated by the controller. In addition, the optimizer is supplied with information regarding the position of each elevator in the elevator system, whether the elevator is currently transporting passengers, going to serve a landing call or whether it is in a rest position. Based on the motional state and position of the elevators and the existing calls, the optimizer calculates the value of a cost function for the possible route alternatives for the elevators and provides an output giving the control system information regarding elevator routing that will minimize the cost function. The model of an elevator in the elevator system must obey the same rules of behavior as the actual elevator.

By the prior-art method for controlling an elevator group, when the target time is 20 seconds, it is possible to are an energy saving of 30-40% as compared to pure waiting time optimization with 0 seconds as the target time. As the waiting time target in the prior-art method can be easily understood and perceived, it is possible to make a simple user interface for it and the setting of the target waiting time can even be entrusted to the personnel of the building. It is also possible to create a programmable calendar of waiting times, allowing different service time targets to be set for different days of the week and times of the day.

The operation of the prior-art method for controlling an elevator group can be improved. The problem arises from the fact that the quantity measured in the prior-art method is actual call times. These measured actual call times are very variable, in other words, the standard deviation of call times is relatively large. From this it follows that the optimizer is unable to function in the best possible manner. If it were possible to predict with a sufficient accuracy the elevator call times to appear in the near future, then the calculation delays of the prior-art method could be reduced and therefore the optimizer could perform the calculations more efficiently. If additionally the standard deviation of the call times included in the prediction could be reduced, then the performance of the optimizer could be improved. These improvements can be implemented by applying the present invention.

OBJECT OF THE INVENTION

The object of the present invention is to improve the construction and operation of the prior-art controller and the optimizer controlled by it and thus to reduce the energy consumed by the elevator system when the set service time target is fulfilled on an average.

As for the features of the invention, reference is made to the claims.

BRIEF DESCRIPTION OF THE INVENTION

The present invention discloses an extension to the elevator group control method described in specification WO 02/066356. In the method according to the said specification, a target value is set for a desired elevator passenger service time. This service time may be e.g. call time, passenger waiting time, traveling time, riding time or the mean value of one of the above-mentioned times. In addition, the target value can be set to be variable according to times of the day, days of the week and holiday periods. The control system comprises an optimizer, which selects the routes for the elevators of the elevator system in such manner that the service time remains at its target value on an average while at the same time the energy consumption of the elevator system is at a minimum. In practice, at the edge condition of fulfilling the average service time, the optimizer minimizes a cost function in which a service time term and an energy consumption term, normalized with set weighting coefficients, are summed. The actually achieved service times are measured and compared to the set target value in an error calculator. The output of the error calculator is connected e.g. to a PID controller, in which the aforesaid weighting coefficient for the energy consumption term is calculated. From this weighting coefficient, it is further possible to calculate the aforesaid weighting coefficient for the service time term. The weighting coefficients are supplied to the cost function optimizer. Information regarding the elevator routes calculated by the optimizer are transferred to the controller of the elevator system.

In the extension of the invention to specification WO 02/066356, the cost function optimizer is connected to a model of the elevator system. By means of this model, it is possible to predict what sort of service times the elevator system will provide in the near future. Thus, the actual adjustment can be implemented in an anticipated manner and a better performance of the cost function optimizer is achieved. Moreover, a service time prediction is obtained by observing active landing calls, and by combining this information with the information obtained from the model of the elevator system it is possible to estimate an average service time.

In a comprehensive and orthodox embodiment of the method of the present invention, all possible route alternatives for the elevators are generated under edge conditions obtained on the basis of the position and motional state of the elevators at the relevant moment and the existing calls. After this, a cost function with the mean service time for the route alternative and the energy consumption required by the route alternative as variables is defined. After this, calculations are carried out to find a set of so-called Pareto-optimal solutions, all of which are best solutions in the sense that when one solution is replaced with another, at least one of the objectives changes to the worse. The Pareto-optimal set contains the route alternatives involving the lowest energy consumption. Finally, the individual route alternative that will implement the desired average service time is selected from this set. The elevators are allocated to the existing active calls in accordance with the route alternative solution thus obtained.

As compared to the method according to specification WO 02/066356, the present invention has the advantage that the energy consumption can be further reduced due to the improved performance of the optimizer. The operating costs incurred by the owner of the building can thus be reduced, and the maintenance costs of the elevator system are likewise reduced.

LIST OF FIGURES

Figure 2:
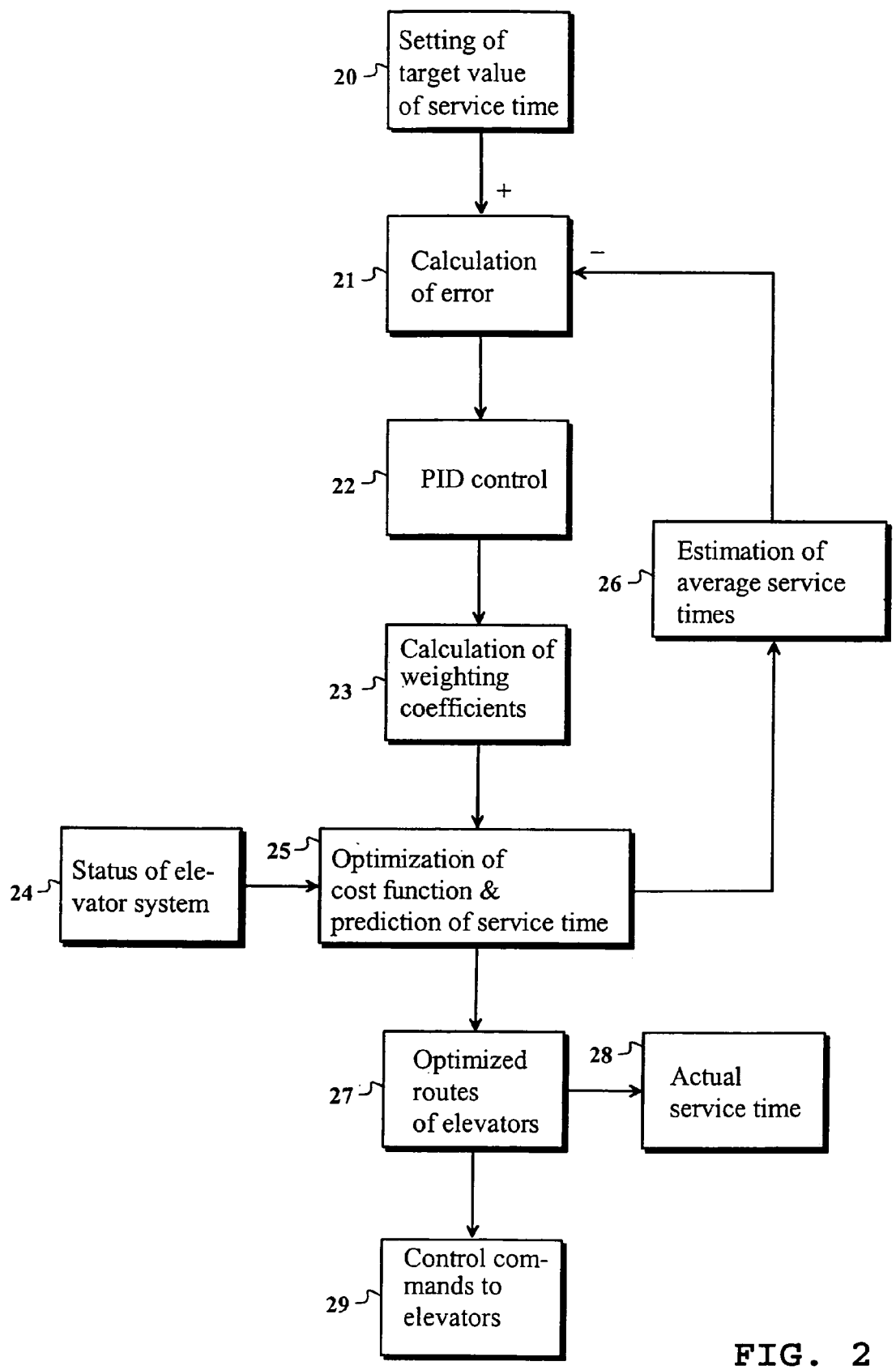
Figure 3:
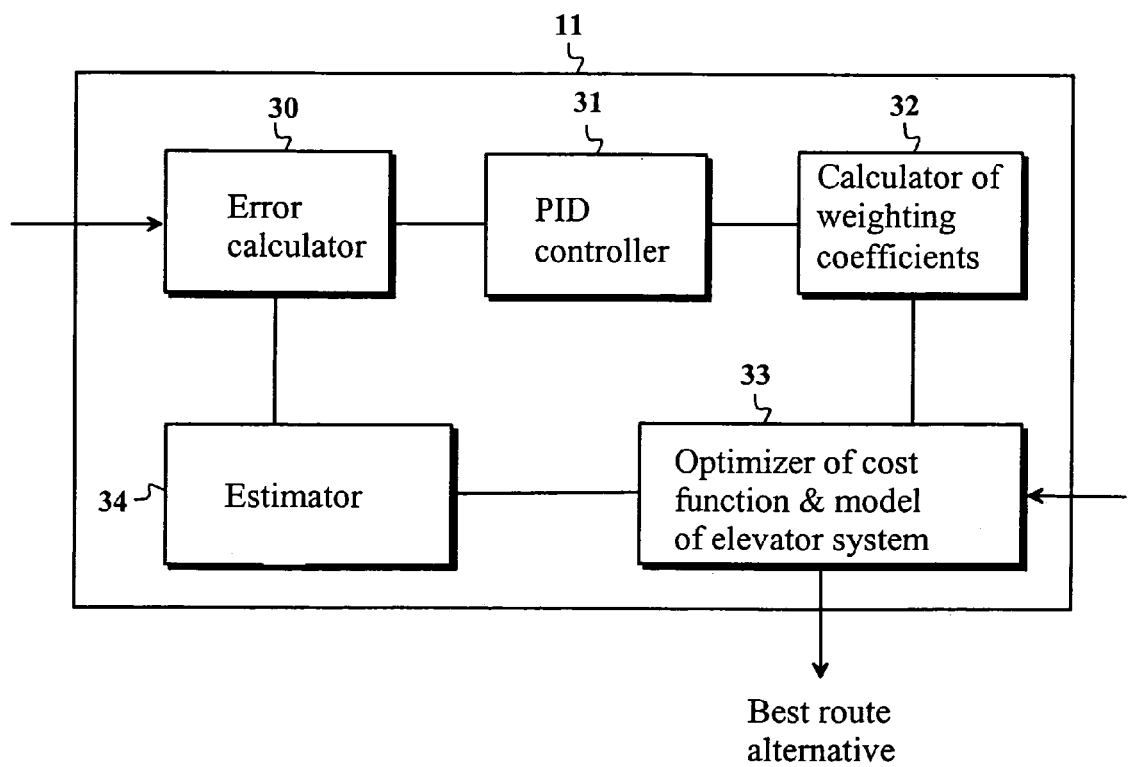

In the following, the invention will be described in detail with reference to a few examples and the attached drawing, wherein FIG. 1 presents an example of a system in which the method of the present invention is applied, FIG. 2 presents a block diagram representing the method of the present invention, and FIG. 3 presents an example of the internal structure of the control logic used in the invention.

DETAILED DESCRIPTION OF THE INVENTION

FIG. 1 presents an example of a system required by the present invention. The core of the system is a control logic 11, which may be implemented e.g. as a computer program that can be run on a computer. All the computing functions relating to the invention are carried out in the control logic. A target value of a desired service time is input to the control logic by the operator 10 of the system. In the present invention, the service time may be e.g. call time, passenger waiting time, traveling time or riding time. Service time may also refer to average values of the aforesaid times, such as e.g. average call time. Typically, the service time use is the waiting time, which is defined as the time interval from the instant of pressing a landing call button to the arrival of the elevator. The system naturally comprises at least one elevator 14. In practice, the movements of the elevators are taken care of by an elevator controller 13, which receives accurate information regarding optimized routing of each elevator from the control logic 11, which calculates the best route alternative for each elevator 14 in the elevator system in real-time. The system additionally comprises sensors and other detection means used to measure the current status 12 of the elevator system. These quantities to be measured include the load of the elevator car, the position and motional state of each elevator, active landing calls, car calls and the calls needed for destination control in each elevator and possibly also the light cell of elevator doors. In addition, the actual service time selected, in this example the passenger waiting time, is observed in real time.

The primary method according to the present invention, implemented using a control logic 11, is presented as a block diagram in FIG. 2. The physical components implementing the method within the control logic are presented in FIG. 3.

In block 20, a target value is set for the service time. In the improvement according to the invention, a model of the elevator system is incorporated with the cost function optimizer in block 33. This model has been constructed on the basis of status data 24 detected about the elevator system in real time to form as close a counterpart of the actual elevator system of the building in question as possible. In addition to prior-art cost function optimization 25, the model is used to predict-the selected service time 25, such as e.g. waiting time. In practice, the predicting is implemented by observing active landing calls, calculating from these the service times for each landing call by utilizing the model of the elevator system, and calculating the average value of these service times. The aforesaid service time is predicted continuously in real time.

The predicted call times obtained from the model of the elevator system are input to an estimator block 34. The variation of the predicted values is equalized in accordance with equation (4) in block 26

$$\hat{f}_{l,k} = \hat{f}_{l,k-1} + (\hat{f}_{l,k-1} - \eta_l(x_k^*)) \cdot G_E, \quad (4)$$

where $\hat{f}_{l,k}$ is $k^{th}$ element of the estimator output, $f_l(x_k^*)$ is $k^{th}$ predicted average call time and $G_E$ is gain of the estimator. The estimator output is compared in an error calculator (adder) 30 to a preset required service level $f_l^*$ according to equation (5), from which an error 21 can be calculated $$e_k = f_l^* - \hat{f}_{l,k}. \quad (5)$$

In the present invention, the error is fed into a PID controller 31. The output of the controller is obtained by summing three error terms. The first error term is directly proportional to the input error term, the second error term is directly proportional to the time integral of the input error term and the third error term is directly proportional to the time derivative of the input error term. In the present invention, on the P and I branches are used, so the output of the controller 31 can be expressed by the equation $$u(t) = u_P(t) + u_I(t) = G_P e(t) + G_I \int_{t_0}^{t} e(t) dt, \quad (6)$$

where e(t) is the error term, $G_P$ and $G_I$ are the gains of the P and I branches, respectively, and $t_0$ is the starting instant of the time window observed by the controller.

The operation of the control 22 is designed to bring the difference between the preset target value 20 (which is set by the operator 10 of the elevator system) and the predicted call time (which is obtained as the output of block 26) to a value close to zero. The controller should function in such a way that it adapts to both internal changes within the control process and to external changes. An external change is e.g. long-term variation in the numbers of elevator customers. An internal change may be e.g. the removal of one of the elevators from the elevator group for reasons like maintenance.

In the present invention, the next step is calculation of the weighting coefficients 23 for the terms of the cost function. This is done in the same way as in the above-described prior-art method. The controller output provides directly the weighting coefficient $W_E$ for the optimization of energy consumption. From this is further obtained the weighting coefficient $W_T$ for the optimization of waiting time according to equation (2). These weighting coefficients are calculated by calculator 32.

The optimizer 33 minimizes the above-mentioned cost function in such a way that the target service time is fulfilled on an average. The objectives of optimization, which in this example are waiting time and energy consumption of the elevator system, are subjected to normalization by a prior-art technique. After the normalization, both running times and energy consumption have a zero mean value and a unity standard deviation. Thus, these quantities of very different types are rendered commensurable and, weighted by the calculated weighting coefficients, they can be summed without problems. The cost function C obtained is of the general form $$C = \sum_{i=1}^{k} W_i \phi_i(x) \quad (7)$$

where $W_i$ is the weighting coefficient and $\phi_i$ is the normalized optimization objective. The weighting coefficients must meet the condition of $$\sum_{i=1}^{k} W_i = 1 \quad (8)$$

and they naturally have to be non-negative numbers.

When the status of the elevator system changes, i.e. for instance a new landing call is issued from one of the floors, this means that the elevator routes have to be calculated anew in accordance with the prevailing situation. In other words, the optimizer has to minimize the cost function again for the elevator route alternatives and select from these routes the one that will minimize the cost function (7).

The information regarding the most advantageous elevator route alternative 27 is transmitted to the elevator control section 29 (controller 13 of the elevators), which in practice implements the movements of the elevators 14 according to the landing calls, car calls, destination control calls and the optimized route result. From the optimized route, the actual service time 28 offered by the elevator system e.g. to each call can also be calculated or measured.

As the standard deviation of the mean of the predicted service times is substantially smaller than the standard deviation of the individual measured service times, it is possible to improve the performance of the aforesaid controller and optimizer 33. The energy consumption of the elevator system can thus be reduced to a lower level than in the elevator group control method according to specification WO 02/066356, yet so that the set target value of the service time is simultaneously fulfilled on an average.

In an extensive and orthodox embodiment of the method of the invention, all the possible elevator route alternatives are generated in the optimizer 33 under edge conditions obtained on the basis of the position and motional state of the elevators at the relevant moment and the existing calls. 'Calls' still refers in general to both car calls, landing calls and destination control calls. After this, a cost function with the average service time for the route alternative and the energy consumption required by the route alternative as variables is defined in the optimizer 33. These variables are vectors in which one element represents the serving of one call in the elevator system. Next, the optimizer 33 performs a search to find a set of so-called Pareto-optimal solutions wherein individual solutions are all best solutions in the sense that, when one solution is replaced with another, at least one of the objectives changes to the worse. However, in no case will all the objectives change to the worse when two solution in the set of Pareto-optimal solutions are compared to each other. The solved set of Pareto-optimal solutions contains the route alternatives involving the lowest energy consumption. This set comprises route alternatives representing a number of different average service times. Finally, the individual route alternative that will implement the desired average service time is selected from the set. The elevators are allocated to the existing calls in accordance with the route alternative solution thus obtained. This orthodox method requires a high computing capacity. However, it will be possible before long to implement this method at a reasonable cost because computing capacity is continuously growing rapidly. As the computing capacity imposes limitations at present, the first-described embodiment of the invention can be regarded as an ideal example of interactive cooperation between "optimizer" and "decision-maker" carried on continuously as a function of time.

The invention is not limited to the embodiment examples described above; instead, many variations are possible within the scope of the inventive concept defined in the claims.

The invention claimed is:

1. A method for controlling an elevator group, in which method the calls are allocated by fulfilling a target value of a desired service time and minimizing the energy consumption, characterized in that the method comprises the steps of:
generating possible elevator route alternatives on the basis of the status of the elevators at the relevant moment and the existing calls;
a cost function with the service time for the route alternative and the energy consumption required by the route alternative as variables is defined;
assigning a target value to a given service time of the elevator group;
predicting the said service time on a continuous basis in a model of the elevator system;
calculating the difference between the said target value and the said service time;
calculating a weighting coefficient for normalized energy consumption and a weighting coefficient for a normalized sum of service times;
summing the normalized sum of service times for the route alternative considered in the cost function to the normalized energy consumption caused by the said route alternative with the calculated weighting coefficients;
a set of route alternative solutions giving the lowest energy consumption is defined; from the set of solutions thus obtained, the solution that fulfills the desired service time is selected; and
the calls are allocated to the elevators by minimizing the said cost function so that the given target value of the service time is fulfilled.

2. A method according to claim 1, characterized in that the method further comprises a step wherein
the service time used is call time, passenger waiting time, traveling time, riding time, average call time, average passenger waiting time, average traveling time or average riding time.

3. A method according to claim 1, characterized in that the method further comprises the step of
minimizing the absolute value of the aforesaid difference.

4. A method according to claim 1, characterized in that the method further comprises the step of
selecting the aforesaid weighting coefficients so that their sum is unity.

5. Method according to claim 1, characterized in that the method further comprises the step of
using information regarding the positions, motional state, traveling directions and car loads of the elevators in the elevator system as well as information regarding landing calls, car calls and calls given via call input devices in the minimization of the aforesaid cost function.

6. A method according to claim 1, characterized in that the method further comprises the step of
using information regarding landing calls active at the relevant moment in the predicting of the aforesaid service time.

7. A method according to claim 1, characterized in that the method further comprises the step of
defining the aforesaid target value in such a way that it will be variable on the basis of times of the day, days of the week and/or holiday periods.

8. A system for controlling an elevator group, which system allocates the calls by fulfilling a target value of a desired service time and minimizing the energy consumption, said system comprising
at least one elevator;
characterized in that the system further comprises:
a generator of elevator route alternatives for generating possible elevator route alternatives on the basis of the status of the elevators at the relevant moment and the existing calls;
an optimizer for defining a cost function, said cost function having the service time for the route alternative and the energy consumption required by the route alternative as variables;
a control logic for settin a target value for a given service time of the elevator group;
a model of the elevator system for continuous prediction of the said service time;
an error calculator for calculating the difference between the said target value and the said predicted service time;
a calculator for calculating weighting coefficients for a normalized energy consumption and a normalized sum of service times;
an optimizer for calculating and optimizing the cost function, said cost function being the sum of the normalized sum of service times for the route alternative in question and the normalized energy consumption caused by the said route alternative with the calculated weighting coefficients;
an optimizer for defining a set of route alternative solutions giving the lowest energy consumption;
an optimizer for selecting the solution that fulfills the desired service time from the set of solutions thus obtained; and
a controller of the elevators for allocating the calls to the elevators in such a way that the aforesaid cost function is minimized and the given target value of the service time is fulfilled.

9. A system according to claim 8, characterized in that the system further comprises
a control logic which receives a service time input consisting of call time, passenger waiting time, traveling time, riding time, average call time, average passenger waiting time, average traveling time or average riding time.

10. A system according to claim 8, characterized in that the system further comprises a controller for minimizing the absolute value of the aforesaid difference.

11. A system according to claim 8, characterized in that the system further comprises a weighting coefficient calculator, which has been arranged to set the sum of the weighting coefficients to unity.

12. A system according to claim 8, characterized in that the system further comprises means for detecting the state of the elevator system to allow information regarding the positions, motional state, traveling directions and car loads of the elevators in the elevator system as well as information regarding landing calls, car calls and calls given via call input devices to be used in the minimization of the aforesaid cost function.

13. A system according to claim 8, characterized in that the system further comprises a model of the elevator system, which uses the information regarding landing calls active at the relevant moment in the predicting of the aforesaid service time.

14. A system according to claim 8, characterized in that the system further comprises a control logic receiving the aforesaid target value as an input, which is defined to be variable on the basis of times of the day, days of the week and/or holiday periods.

* * * * *